United States Patent Office 2,922,746
Patented Jan. 26, 1960

2,922,746
MICROBIOLOGICAL PRODUCT AND METHOD OF MAKING THE SAME

Miguel Liberio Gratacos, Lanus, Argentina

No Drawing. Application January 30, 1956
Serial No. 562,037

3 Claims. (Cl. 167—78)

This invention relates to a new product of bacterial metabolism for treating allergic affections and to a process for preparing the new product. More particularly, the invention relates to a complex concentrated product of bacterial metabolism which has proved, in practice, to be effective in successfully treating and alleviating various types of allergic affections as well as asthma and even rheumatism, and to a process for preparing the same.

A primary object of the invention is to provide a new complex concentrated product of bacterial metabolism which is useful in the treatment of allergic affections, asthma, and rheumatism, and a method of obtaining it.

In accordance with the invention, the new complex concentrate is obtained by inoculating a culture medium comprising meat broth, glucose and human blood or plasma, with at least two selected bacteria of the type of staphylococci, streptococci, pneumococci, catarrh micrococci and the like and incubating the inoculated medium for a period of about 3 to 4 days and thereafter sterilizing the culture medium with a camphor solution of phenic acid.

The method of preparing the complex concentrate comprises the combination of the following steps:

(a) Preparation of a specific culture medium based on meat broth (preferably beef broth), glucose and human blood or plasma;

(b) Inoculation of the culture medium with the selected bacteria;

(c) Incubation of the inoculated medium until substantially all of the nutrients thereof are consumed and the complex product of the bacterial metabolism is produced in maximum yield;

(d) Separation of the complex concentrate from the fermentate and working up thereof.

In accordance with one embodiment of the invention, the meat broth is mixed with sodium chloride and bacteriological peptone in the usual small amounts, the mixture is neutralized and sterilized at a temperature of 120° C. to 125° C. and not exceeding 125° C. This effects the simultaneous precipitation of the coagulable components, foreign proteins and insoluble salts formed by the neutralization at the temperature employed. Glucose (1 to 3 parts per 100 parts by volume of the neutral broth) is then added, the mass is allowed to cool down to a temperature between room temperature and, say, 50° C., the pH thereof is adjusted to 6.8 to 7.2, and the mass is sterilized but at somewhat lower temperature (110° C. to 115° C.) than is used in effecting the first sterilization. One to 3 parts of human blood hemolized in sterile distilled water per 100 parts by volume of the mass are then added after the second sterilization and cooling of the medium to about normal blood temperature.

Small amounts (from traces up to 5% of the quantity of the culture medium) of vitamins and inorganic salts which exert a stimulating effect on the growth of bacteria may also be incorporated in the culture medium. The addition of such substances is optional, however, although generally preferred.

According to a further specific aspect of the invention, the culture medium prepared as described above may be inoculated with bacteria of the types specified and taken from strains developed in the geographical region in which the complex concentrate is to be used.

The bacterial metabolism may be caused to proceed in the culture medium by maintaining the inoculated medium at about 38° C. to 38.5° C. for about 3–4 days, preferably with periodic agitation thereof and eventually by repeating the inoculation so as to continue the bacterial metabolism until substantially all of the nutrients of the medium have been consumed, thereby ensuring formation of the complex produced by the bacterial metabolism in concentrated form.

Separation of the complex concentrate from the fermentate, and working up of the concentrate may be accomplished by sterilizing the fermentate with a camphor solution of phenic acid, followed by decantation, purification of the decanted liquid, and sterility control of the liquid for several days followed by filling of the liquid into vials or, if desired, dehydration by lyophilization.

The following example is given to illustrate the invention, it being understood that the example is not intended to be limitative.

Example

A broth of animal (beef) meat is prepared in the usual way. Sodium chloride and bacteriological peptone are added to it. The broth is then neutralized with sodium carbonate in normal solution. The mixture is sterilized for about 15 minutes in containers having a capacity not exceeding 1 liter at a temperature of about but not exceeding 125° C. so as to simultaneously cause precipitation of coagulable components, foreign proteins and insoluble salts formed in the neutralization at the temperature employed.

The precipitates are removed, and the meat broth is allowed to stand and cool down to about room temperature. Two parts of glucose per 100 parts by volume of the broth are added. The following stimulants for bacterial growth are then incorporated in the resulting mass:

| Stimulant | Amount |
| --- | --- |
| Streptogenine | 1–5% of the quantity of the culture medium. |
| Pantothenic acid | 100 micrograms. |
| Biotin | traces. |
| Nicotinamide | 5 micrograms. |
| Pyrodoxine | 20 micrograms. |
| Aneurin | 0.1 microgram. |
| Magnesium sulfate | traces. |
| Ferrous sulfate | Do. |
| Cobalt sulfate | Do. |
| Manganese sulfate | Do. |
| Zinc sulfate | Do. |
| Copper sulfate | Do. |
| Sodium molybdate | Do. |
| Potassium iodide | Do. |

The pH of the fortified culture medium is adjusted to 7.0–7.2 in known manner, the medium is then sterilized at 115° C. and after cooling down to about 38° C.–38.5° C., there are added to the medium 2 parts by volume (per each 100 parts by volume of the medium) of human blood hemolized in sterile distilled water, the amounts of blood and water being approximately equal.

The resulting culture medium, at 38° C.–38.5° C., is inoculated with a mixture of the microorganisms staphylococci and streptococci.

The inoculated medium is incubated in containers presenting a relatively large surface area and at a temperature maintained at 38° C. to 38.5° C. with periodic agitation for about four days after which period the nutrients of the medium appear to be substantially completely consumed. The fermentate is then sterilized by means of a 65% solution of phenic acid in camphor, the quantity of such solution used being such that about 5% of phenic acid is introduced into the fermentate. Thereafter, the complex concentrate produced by the bacterial metabolism is separated from the fermentate by decantation and the decanted liquid is filtered or purified in other known manner. The sterility of the concentrated complex is controlled for several (3–5) days and thereafter the complex is filled into vials of predetermined dosage capacity under sterile conditions.

In order to preserve the product obtained as described for an indefinite period of time, it is advantageous to subject it to lyophilization.

The concentrated complex compound thus obtained has a pH of about 5.5. Its chemical composition has not been determined as yet. However, the product has been injected subcutaneously into more than 1000 persons and has been found to be very effective in treating all kinds of allergy, asthma and even rheumatism. The anti-allergic effect of this product (contrary to the so-called phenomenon of Burky) consists in insensitizing allergic persons to most of the allergenic substances in spite of the fact that the complex does not itself contain any such allergenic substances.

The foregoing illustrates the preferred procedures for carrying out the invention. However, as will be understood, various changes and modifications may be made in the specific details given, as for instance in the order of addition of the glucose and blood to the meat broth. Also, the human blood may be replaced by plasma, used in similar amounts. Broadly, the invention resides in the inoculation of the culture medium comprising meat broth, glucose and human blood or plasma with at least two microorganisms of the types mentioned, and incubating the inoculated medium under conditions most favorable to growth of the microorganisms until substantially all of the nutrients are consumed and the complex product of the bacterial metabolism is produced in concentrated condition, more than one inoculation of the medium with the selected microorganisms being made if necessary or desirable. Since the changes and modifications in details may be made without departing from the spirit and scope of the invention, it is to be understood that it is not intended to limit the invention except as defined in the appended claims.

What is claimed is:

1. A process for preparing a complex bacterial metabolite which consists in the steps of preparing a culture medium comprising a mixture of beef meat broth, sodium chloride and peptone, neutralizing said culture medium by the addition thereto of aqueous alkali, sterilizing the resultant solution by subjecting the same to a temperature of about 120° C. for 15 minutes to cause precipitation of coagulable material and insoluble matter, separating the precipitate from the solution and recovering a mother culture liquor, introducing glucose into said culture liquor, sterilizing the resultant liquor at a temperature of about 115° C., thereafter cooling the sterile culture liquor to room temperature and adding a blood substance thereto selected from the group consisting of human blood and blood plasma, then inoculating the culture medium with at least two microorganisms selected from the group consisting of staphylococci, streptococci, pneumococci, and *Micrococcus catarrhalis,* and maintaining the resultant inoculated culture medium at a temperature of about 38° C. and under conditions for bacterial growth from three to four days and until substantially all of the nutrients thereof are consumed, thereafter filtering the resultant metabolite composition to recover a relatively pure metabolite, and sterilizing said metabolite by the addition of 5% by weight phenic acid based on the total weight of said relatively pure metabolite.

2. A process for preparing a complex bacterial metabolite which consists in the steps of preparing a culture medium comprising a mixture of beef meat broth, sodium chloride and peptone, neutralizing said culture medium by the addition thereto of aqueous alkali, sterilizing the resultant solution by subjecting the same to a temperature of about 120° C. for 15 minutes to cause precipitation of coagulable material and insoluble matter, separating the precipitate from the solution and recovering a mother culture liquor, introducing glucose into said culture liquor, sterilizing the resultant liquor at a temperature of about 115° C., thereafter cooling the sterile culture liquor to room temperature and adding a blood substance thereto selected from the group consisting of human blood and blood plasma, then inoculating the culture medium with at least two microorganisms selected from the group consisting of staphlococci, streptococci, pneumococci, and *Micrococcus catarrhalis,* and maintaining the resultant inoculated culture medium at a temperature of about 38° C. and under conditions for bacterial growth from three to four days and until substantially all of the nutrients thereof are consumed, thereafter filtering the resultant metabolite composition to recover a relatively pure metabolite, and sterilizing said metabolite by the addition of a phenic acid-camphor solution.

3. A process for preparing a complex bacterial metabolite which consists in the steps of preparing a culture medium comprising a mixture of beef meat broth, sodium chloride and peptone, neutralizing said culture medium by the addition thereto of aqueous alkali, sterilizing the resultant solution by subjecting the same to a temperature of about 120° C. for 15 minutes to cause precipitation of coagulable material and insoluble matter, separating the precipitate from the solution and recovering a mother culture liquor, introducing glucose into said culture liquor, sterilizing the resultant liquor at a temperature of about 115° C., thereafter cooling the sterile culture liquor to room temperature and adding a blood substance thereto selected from the group consisting of human blood and blood plasma, then inoculating the culture medium with at least two microorganisms selected from the group consisting of staphylococci, streptococci, pneumococci, and *Micrococcus catarrhalis,* and maintaining the resultant inoculated culture medium at a temperature of about 38° C. and under conditions for bacterial growth from three to four days and until substantially all of the nutrients thereof are consumed, thereafter filtering the resultant metabolite composition to recover a relatively pure metabolite, and sterilizing said metabolite by the addition of a 65% solution of phenic acid dissolved in camphor, and wherein the quantity of the phenic acid solution added is such as to introduce 5% by weight phenic acid based on the total weight of said relatively pure metabolite.

References Cited in the file of this patent

UNITED STATES PATENTS

| 2,340,318 | Gerlough | Feb. 1, 1944 |

FOREIGN PATENTS

| 357,553 | Great Britain | Sept. 21, 1931 |
| 608,596 | Great Britain | Sept. 17, 1948 |
| 664,449 | Great Britain | Jan. 9, 1952 |

OTHER REFERENCES

Cox: The Mil. Surg., September 1933, pp. 121–128.

Levine: "A Compilation of Culture Media for Cultivation of Microorganisms," 1930, pp. 837 and 838.

Zinsser's Textbook of Bacteriology, pub. 1948, pp. 243, 244, 250, 256, 257, 273, 274, 292, 293, 912–916.

Difco Manual, 9th ed., 1953, pp. 101–102.